US008345807B2

(12) United States Patent
Nadamoto et al.

(10) Patent No.: US 8,345,807 B2
(45) Date of Patent: Jan. 1, 2013

(54) DEMODULATION DEVICE (75) Inventors: Yuji Nadamoto, Kyoto (JP); Yasuo Hamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 207 days.

(21) Appl. No.: 12/663,330

(22) PCT Filed: May 7, 2009

(86) PCT No.: PCT/JP2009/001995
§ 371 (c)(1),
(2), (4) Date: Dec. 7, 2009

(87) PCT Pub. No.: WO2009/136494
PCT Pub. Date: Nov. 12, 2009

(65) Prior Publication Data
US 2011/0051866 A1    Mar. 3, 2011

(30) Foreign Application Priority Data
May 9, 2008    (JP) .................................. 2008-123088

(51) Int. Cl.
H04B 7/10    (2006.01)
(52) U.S. Cl. ........ 375/347; 375/343; 375/136; 455/139; 455/276.1
(58) Field of Classification Search .................. 375/347, 375/260; 455/139, 276
See application file for complete search history.

(56) References Cited
U.S. PATENT DOCUMENTS
4,512,034 A * 4/1985 Greenstein et al. ........... 455/139
5,349,609 A 9/1994 Tsujimoto
5,748,673 A 5/1998 Futagi et al.
2004/0125858 A1* 7/2004 Ohtaki et al. ................. 375/136
2005/0147190 A1* 7/2005 Nishikawa .................... 375/343
2008/0030265 A1 2/2008 Ido et al.

FOREIGN PATENT DOCUMENTS
| JP | 57-111132 | 7/1982 |
| JP | 06-061893 | 3/1994 |
| JP | 08-204624 | 8/1996 |
| JP | 2003-215231 A | 7/2003 |
| JP | 2003-283403 A | 10/2003 |
| JP | 3724501 | 9/2005 |

OTHER PUBLICATIONS
International Search Report for International Application No. PCT/JP2009/001995, Jun. 2, 2009, Panasonic Corporation.

* cited by examiner

Primary Examiner — Eva Puente
(74) Attorney, Agent, or Firm — RatnerPrestia (57) ABSTRACT A demodulation device comprises at least a diversity combiner, an elimination parameter storage, an elimination parameter investigator, a noise eliminator, and a noise collection means. The elimination parameter storage stores elimination parameters used for eliminating a noise, as elimination parameters for each of antennas, the noise collection means receives a noise and outputs the received noise as a collected noise signal, and the diversity combiner outputs a combined signal along with combining parameters, each representing a parameter related to the combining for each of the antennas. The noise eliminator eliminates the noise by using the elimination parameters for all the antennas as well as the combining parameters for all the antennas.

8 Claims, 5 Drawing Sheets

Figure 5:
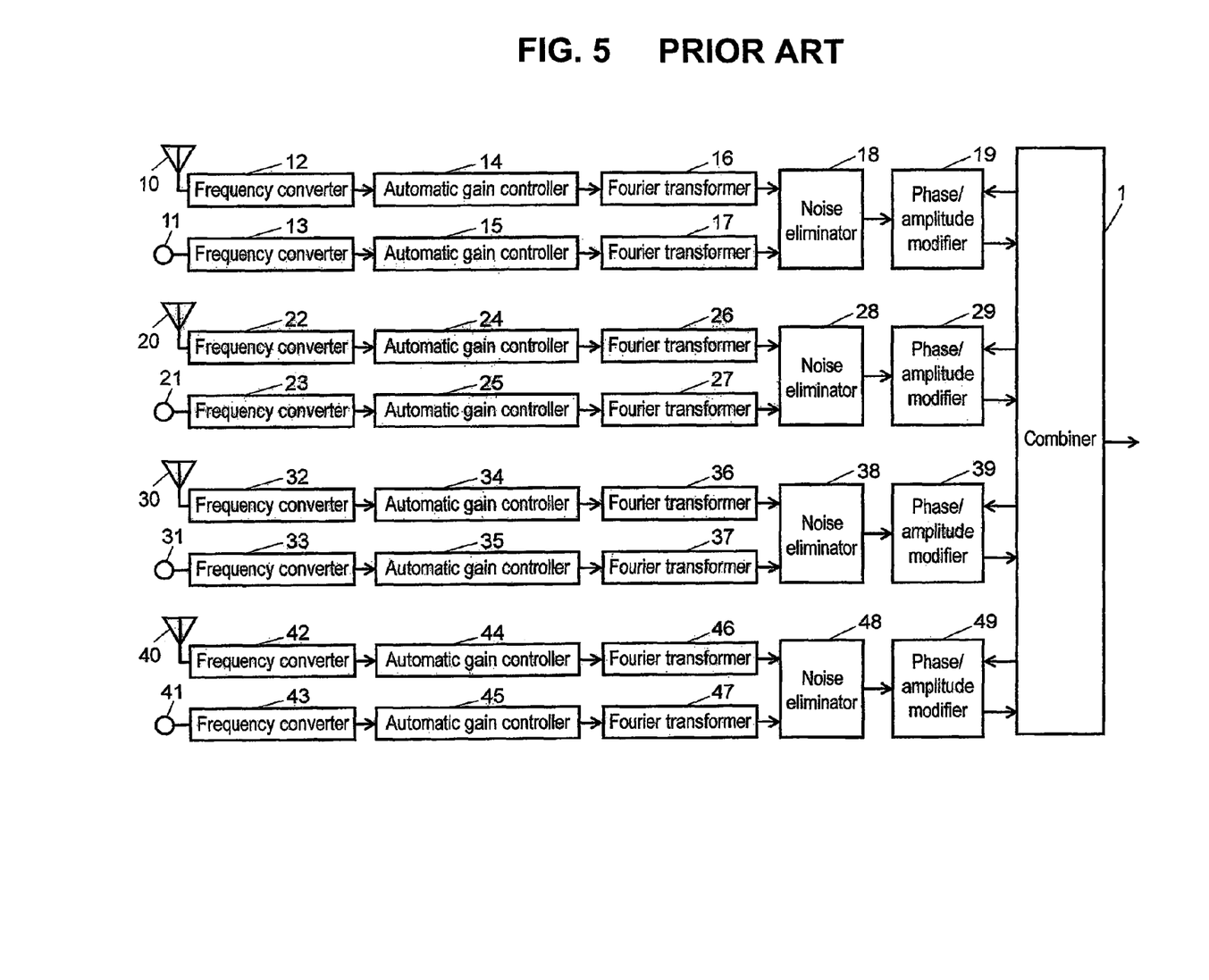
FIG. 5 is a schematic diagram showing a configuration of a conventional diversity demodulation device provided with a noise eliminating function.

FIG. 5   PRIOR ART they then adjust phases and amplitudes of the noise signals, eliminate noise signal components from the main signals, and output noise-eliminated signals. Phase/amplitude modifiers 19, 29, 39 and 49 modify the phases and amplitudes of the noise-eliminated signals according to commands of combiner 1, and output phase/amplitude modified signals. Combiner 1 combines the phase/amplitude modified signals output from four phase/amplitude modifiers 19, 29, 39 and 49, in addition to giving the command of phase value and amplitude level individually to the four phase/amplitude modifiers 19, 29, 39 and 49.

There is a drawback with the conventional demodulation device described above, however, that it requires as many number of noise eliminators as that of the antennas.

Patent Literature 1: Japanese Patent, No. 3,724,501
Patent Literature 2: Japanese Patent Unexamined Publication, No. 1982-111132

DEMODULATION DEVICE

This application is a U.S. National Phase Application of PCT International Application PCT/JP2009/001995.

TECHNICAL FIELD

The present invention relates to a demodulation device for receiving and demodulating radio waves using a diversity scheme.

BACKGROUND ART

Various diversity techniques are known to achieve optimum results of demodulation by receiving radio waves with a plurality of antennas and combining them after having adjusted their phases and amplitudes individually. Patent literature 1 discloses, for instance, one of these techniques. There are also techniques of eliminating noises as other ways of improving sensitivity of the reception. One example of such techniques is to provide a second antenna for receiving a noise in addition to a first antenna for receiving the intended radio waves and to cancel out the noise by adjusting a phase and amplitude of the noise and combining it to a signal from the first antenna to achieve excellent reception. This technique is disclosed in patent literature 2 for instance. When used, this technique can reduce an influence of noise generated by the receiver itself upon the reception. It thus becomes possible to improve sensitivity of the reception even further by combining these two techniques and adding the process of eliminating the noise for each of the diversity antennas. FIG. 5 shows a conventional demodulation device representing one such example provided with four antennas for making diversity reception of terrestrial digital broadcasting waves while eliminating noises.

In FIG. 5, the demodulation device comprises antennas 10, 20, 30 and 40 for receiving radio waves of terrestrial digital broadcasting, noise collection probes 11, 21, 31 and 41, frequency converters 12, 13, 22, 23, 32, 33, 42 and 43, Automatic gain adjusters 14, 15, 24, 25, 34, 35, 44 and 45, Fourier transformers 16, 17, 26, 27, 36, 37, 46 and 47, noise eliminators 18, 28, 38 and 48, phase/amplitude modifiers 19, 29, 39 and 49, and combiner 1.

Antennas 10, 20, 30 and 40 receive radio waves that become potential noises generated by the receiver itself, besides the terrestrial digital broadcasting radio waves. Frequency converters 12, 22, 32 and 42 convert the radio waves received by antennas 10, 20, 30 and 40 into a predetermined frequency, and output them. Automatic gain adjusters 14, 24, 34 and 44 adjust gains of signals output from frequency converters 12, 22, 32 and 42 to bring them into a predetermined power level, and output them. Fourier transformers 16, 26, 36 and 46 perform Fourier transforms on the output signals of Automatic gain adjusters 14, 24, 34 and 44, and feed them as main signals to noise eliminators 18, 28, 38 and 48. On the other hand, noise collection probes 11, 21, 31 and 41 receive noises generated by the receiver itself. Frequency converters 13, 23, 33 and 43 convert noises received by noise collection probes 11, 21, 31 and 41 into the same predetermined frequency as frequency converters 12, 22, 32 and 42, and output them. Automatic gain adjusters 15, 25, 35 and 45 adjust gains of signals output from frequency converters 13, 23, 33 and 43 to bring them into a predetermined power level. Fourier transformers 17, 27, 37 and 47 feed the output signals of automatic gain adjusters 15, 25, 35 and 45 as noise signals to noise eliminators 18, 28, 38 and 48, after performing Fourier transforms on them. Noise eliminators 18, 28, 38 and 48

SUMMARY OF THE INVENTION

A demodulation device comprises a first elimination parameter storage for storing elimination parameters defined as first elimination parameters used for eliminating a noise for each of antennas, a noise collector for receiving the noise and outputting it as a collected noise signal, a diversity combiner for combining radio waves received from the plurality of antennas to obtain a combined signal and outputting the combined signal along with combining parameters, each representing a parameter related to the combining for each of the antennas, and a first noise eliminator for reading the first elimination parameters from the first elimination parameter storage, receiving the combined signal, the combining parameters and the collected noise signal to execute elimination of the noise, and outputting a noise-eliminated signal.

Another demodulation device comprises a second elimination parameter storage for storing elimination parameters defined as second elimination parameters used for eliminating a noise for each of antennas, a noise collector for receiving the noise and outputting the received noise as a collected noise signal, a diversity combiner for combining radio waves received from the plurality of antennas to obtain a combined signal and outputting it along with combining parameters, each representing a parameter related to the combining for each of the antennas, an elimination parameter investigator for receiving the second elimination parameters from the second elimination parameter storage, obtaining a noise-eliminated signal, and outputting the second elimination parameters, and a second noise eliminator for receiving the combined signal, the second elimination parameters, the combining parameters and the collected noise signal to execute elimination of the noise, and outputting the noise-eliminated signal.

DETAILED DESCRIPTION OF PREFERRED EMBODIMENTS

In a demodulation device having a plurality of antennas for receiving and demodulating radio waves, the present invention provides the demodulation device with a configuration capable of eliminating noises only with a single component regardless of a number of the antennas. Description is provided hereinafter of the preferred embodiments of the present invention with reference to the accompanying drawings.

First Exemplary Embodiment

Figure 1:
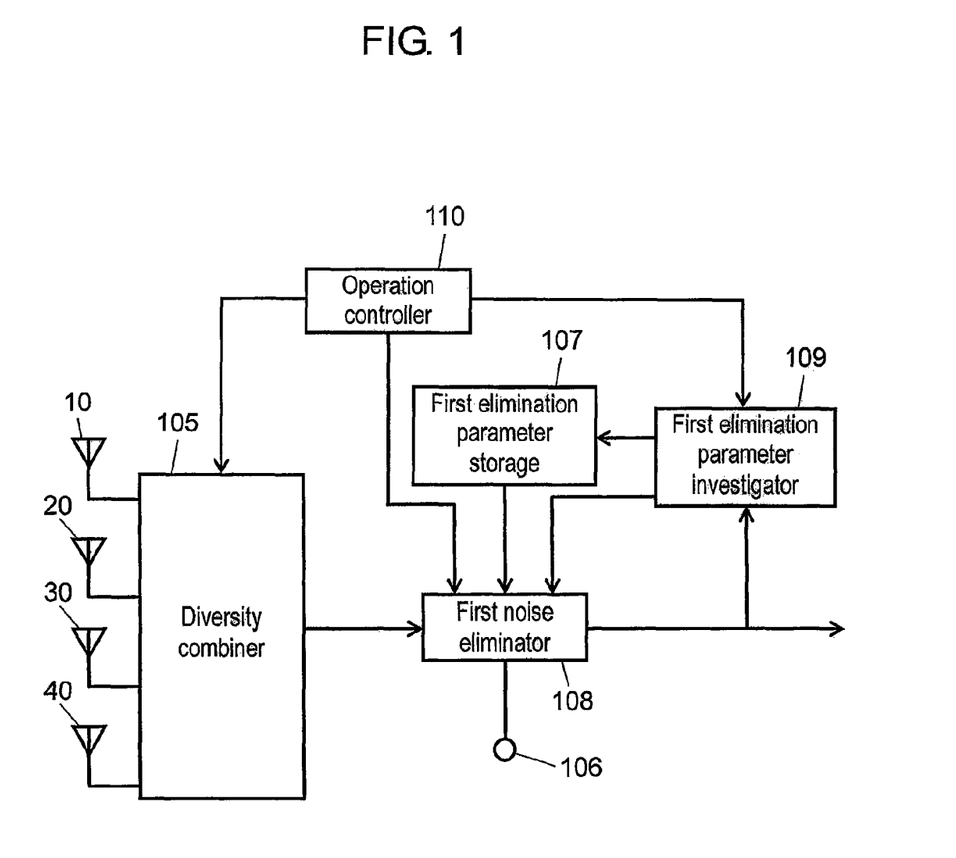
FIG. 1 is a schematic diagram showing a typical configuration of a demodulation device according to a first exemplary embodiment.

FIG. 1 shows a typical configuration of a demodulation device according to the first exemplary embodiment of this invention. The demodulation device in FIG. 1 comprises antennas 10, 20, 30 and 40, diversity combiner 105, noise collection probe 106, first elimination parameter storage 107, first noise eliminator 108, first elimination parameter investigator 109, and operation controller 110. Antennas 10, 20, 30 and 40 receive radio waves. Diversity combiner 105 demodulates the radio waves received with antennas 10, 20, 30 and 40, diversity-combines them, and outputs a combined signal. Noise collection probe 106 collects noises generated by the demodulation device. Noise collection probe 106 is an example of noise collector for receiving the noises generated by the demodulation device and outputting it as a collected noise signal. First elimination parameter storage 107 stores first elimination parameters used for eliminating the noise for each of the antennas. First noise eliminator 108 eliminates a collected noise component from the combined signal output by diversity combiner 105. First elimination parameter investigator 109 investigates the first elimination parameters used for eliminating the noise for each of antennas 10, 20, 30 and 40. Operation controller 110 gives a command of operation to each of diversity combiner 105, first noise eliminator 108 and first elimination parameter investigator 109.

An example presented here for the purpose of explanation is a demodulation device using the method of orthogonal frequency division multiplexing (which may be referred to hereinafter as OFDM) for receiving terrestrial digital broadcasting signals.

First elimination parameter storage 107 stores first elimination parameters used for eliminating the noises. Although the first elimination parameters can be determined while the demodulation device is being used normally by the user, the example described here is of the case, in which the determination is made in advance. In this case, the demodulation device performs two different operations, namely an elimination parameter investigating operation and a normal operation.

Description is provided first of the elimination parameter investigating operation. Operation controller 110 gives diversity combiner 105, first noise eliminator 108 and first elimination parameter investigator 109 a command of investigating the first elimination parameters for antenna 10.

When diversity combiner 105 receives the command of investigating the first elimination parameters for antenna 10 from operation controller 110, it takes in only a radio wave obtained from antenna 10 while cutting off signals from other antennas 20, 30 and 40, converts it into a predetermined frequency band, and adjusts it to a predetermined gain. Diversity combiner 105 then performs Fourier transform on the adjusted signal, and outputs the obtained signal denoted as an uncombined signal without making any change in the phase and amplitude for diversity combining.

When first elimination parameter investigator 109 received the command of investigating the first elimination parameters for antenna 10 from operation controller 110, it gives to first noise eliminator 108 a phase adjusting factor θ and an amplitude adjusting factor θ of the noises in order to obtain optimum values of phase adjusting factor θ and amplitude adjusting factor θ of the noises. For example, first elimination parameter investigator 109 sets a range of phase adjusting factor θ between 170 and 190 degrees in increments of one degree, and gives a value of 170 degrees to first noise eliminator 108. First elimination parameter investigator 109 also sets a range of amplitude adjusting factor θ between multipliers 0.1 and 2.0 in increments of 0.1, and gives a value of 0.1 to first noise eliminator 108.

Noise collection probe 106 receives electromagnetic noises generated by this demodulation device and outputs a collected noise signal.

When first noise eliminator 108 receives the command of investigating the first elimination parameters from operation controller 110, it carries out a process of adjusting a phase and amplitude of the collected noise signal received from noise collection probe 106 by using phase adjusting factor θ and amplitude adjusting factor θ provided by first elimination parameter investigator 109. First noise eliminator 108 then combines a signal thus produced by this process and the uncombined signal output from diversity combiner 105. When the uncombined signal and the collected noise signal are denoted as X(t) and N(t) respectively, a signal obtained after combining them, expressed as Y(t) holds a relation of equation (1).

$$Y(t)=X(t)+N(t)\times G\times e^{j\theta} \quad (1)$$

First elimination parameter investigator 109 receives the signal Y(t), and checks a condition of reception on the basis of a carrier-to-noise ratio ("C/N ratio"), a bit error rate and the like of the digital signal. First elimination parameter investigator 109 also figures out the optimum values of phase adjusting factor θ and amplitude adjusting factor θ by changing their values, and stores the obtained values in first elimination parameter storage 107 as first elimination parameters θ1 and G1 for antenna 10.

Operation controller 110 also gives the same command for each of antennas 20, 30 and 40 to carry out the processes similar to those of antenna 10 for investigating first elimination parameters θ2 and G2 for antenna 20, first elimination parameters θ3 and G3 for antenna 30 and first elimination parameters θ4 and G4 for antenna 40, and has them stored in first elimination parameter storage 107.

Figure 2:
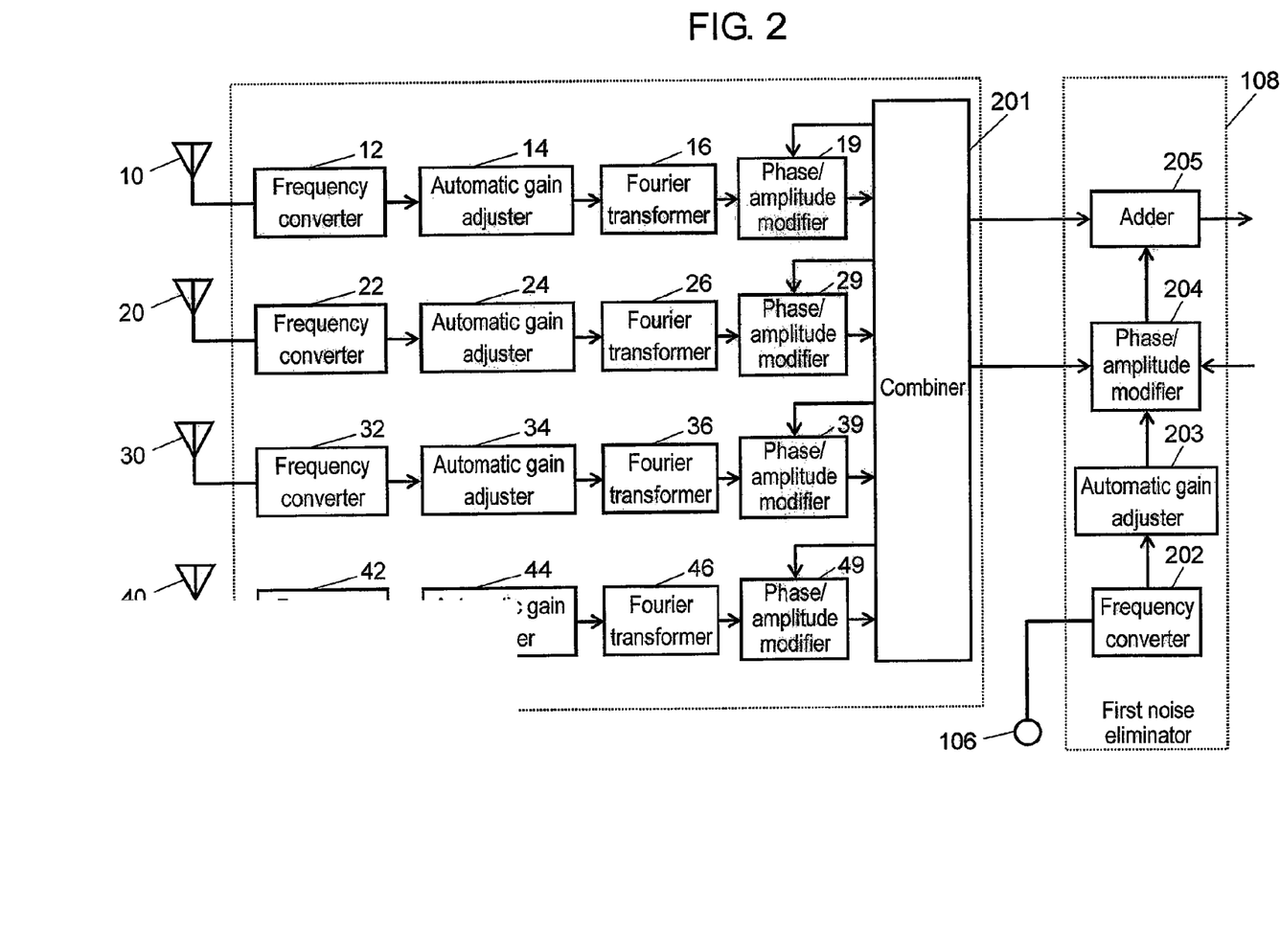
FIG. 2 is a schematic diagram showing a typical internal configuration of a diversity combiner and a noise eliminator.

Description is provided next of the normal operation. Operation controller 110 gives a command of the normal operation to diversity combiner 105, first noise eliminator 108 and first elimination parameter investigator 109. FIG. 2 is a schematic diagram showing a typical internal configuration of diversity combiner 105 and first noise eliminator 108. When the command is given for the normal operation, the demodulation device operates in a manner, which is described hereinafter with reference to FIG. 2.

In FIG. 2, diversity combiner 105 comprises frequency converters 12, 22, 32 and 42, automatic gain adjusters 14 and 24, 34 and 44, Fourier transformers 16, 26, 36 and 46, phase/amplitude modifiers 19 and 29, 39 and 49, and combiner 201. First noise eliminator 108 comprises frequency converter 202, automatic gain adjuster 203, phase/amplitude modifier 204, and adder 205. Antennas 10, 20, 30 and 40 receive radio waves of the terrestrial digital broadcasting. Noise collection probe 106 collects noises generated by the demodulation device. Phase/amplitude modifier 204 modifies a phase and amplitude of signal input therein. Adder 205 adds signals input therein.

Description is provided first of operation inside diversity combiner 105. Frequency converters 12, 22, 32 and 42 receive the radio waves of the terrestrial digital broadcasting from antennas 10, 20, 30 and 40, convert them into a predetermined frequency and output the converted signals. Automatic gain adjusters 14, 24, 34 and 44 adjust gains of the signals output from frequency converters 12, 22, 32 and 42 to bring them into a predetermined power level, and output the converted signals. Fourier transformers 16, 26, 36 and 46 perform Fourier transform on the signals output from automatic gain adjusters 14, 24, 34 and 44, and output them. Phase/amplitude modifiers 19, 29, 39 and 49 generate phase/amplitude modified signals by modifying phases and amplitudes of the output signals of Fourier transformers 16, 26, 36 and 46 by extents of phase ω and amplitude g provided by combiner 201. These phase/amplitude modified signals are input to combiner 201.

Combiner 201 combines the four phase/amplitude modified signals received from phase/amplitude modifiers 19, 29, 39 and 49, and outputs the combined signal to adder 205 in first noise eliminator 108. At the same time, combiner 201 provides phase/amplitude modifiers 19, 29, 39 and 49 with data indicating adjusting values of the phase and amplitude for diversity combining. The adjusting values of the phase and amplitude are denoted here as ω1 and g1 for those given to phase/amplitude modifier 19, ω2 and g2 for those given to phase/amplitude modifier 29, ω3 and g3 for those given to phase/amplitude modifier 39, and ω4 and g4 for those given to phase/amplitude modifier 49. Combiner 201 also outputs these adjusting values ω1, ω2, ω3, ω4, g1, g2, g3 and g4 to phase/amplitude modifier 204 of first noise eliminator 108 as combining parameters.

Noise collection probe 106 receives the electromagnetic noises generated by the demodulation device, and outputs a collected noise signal.

Frequency converter 202 of first noise eliminator 108 converts the collected noise signal into a signal of the same frequency as that of frequency converters 12, 22, 32 and 42.

Automatic gain adjuster 203 adjusts a gain of the signal output from frequency converter 202 to bring it into a predetermined power level, and outputs it as the collected noise signal.

Phase/amplitude modifier 204 receives the first elimination parameters θ1, θ2, θ3, θ4, G1, G2, G3 and G4 for the individual antennas from first elimination parameter storage 107 shown in FIG. 1. Phase/amplitude modifier 204 also receives the combining parameters ω1, ω2, ω3, ω4, g1, g2, g3 and g4 from combiner 201. Phase/amplitude modifier 204 then generates a noise canceling signal to cancel the noises in the signal multiplexed by combiner 201. In other words, phases and amplitudes of the noises picked up by antennas 10, 20, 30 and 40 are changed to the same extents as the phases and the amplitudes of the signals received by the individual antennas 10, 20, 30 and 40 when they are adjusted in the diversity processing. It is for this reason that the phase and the amplitude of the collected noise signal are also changed to the same extents as those of the received signals before applying the first elimination parameters to eliminate the noises from the diversity-combined signal. When the noise signal and the noise canceling signal are denoted as N(t) and C(t) respectively, they then hold a relation of equation (2).

$$C(t) = \sum_{i=1}^{4} \{N(t) \times (G_i \times e^{j\theta_i}) \times (g_i \times e^{j\omega_i})\} \quad (2)$$

Adder 205 adds the combined signal output from combiner 201 and the noise canceling signal output from phase/amplitude modifier 204, and outputs a noise eliminated signal.

According to the first exemplary embodiment as discussed above, first noise eliminator 108 has the function of collectively eliminating all noises in the plural branches of antennas 10, 20, 30 and 40, thereby achieving the process of noise elimination within the single component regardless of a number of the antennas. In addition, the process of noise elimination can be executed at the start of receiving signals since elimination parameter storage 107 has the noise elimination parameters investigated in advance and stores therein.

In this exemplary embodiment, although the description has been provided of one example of the device for receiving the terrestrial digital broadcasting waves, this is illustrative and not restrictive, and that the present invention is adaptable generally to all types of devices equipped with a plurality of antennas for receiving radio waves. Moreover, although the above embodiment shows four antennas, this is also illustrative and not restrictive such that there can be any number of antennas.

Second Exemplary Embodiment

A demodulation device according to the second exemplary embodiment of the present invention differs from the demodulation device of the first exemplary embodiment in respects of that the device of this embodiment performs only the normal operation instead of the two operations discussed above, requires no operation controller for switching the operation, and has a second noise eliminator and a second elimination parameter investigator for controlling second elimination parameters in a different manner. Since the demodulation device of this exemplary embodiment is similar in all other aspects to the one discussed in the first exemplary embodiment, description is provided herein with an emphasis placed on the different portions stated above.

Figure 3:
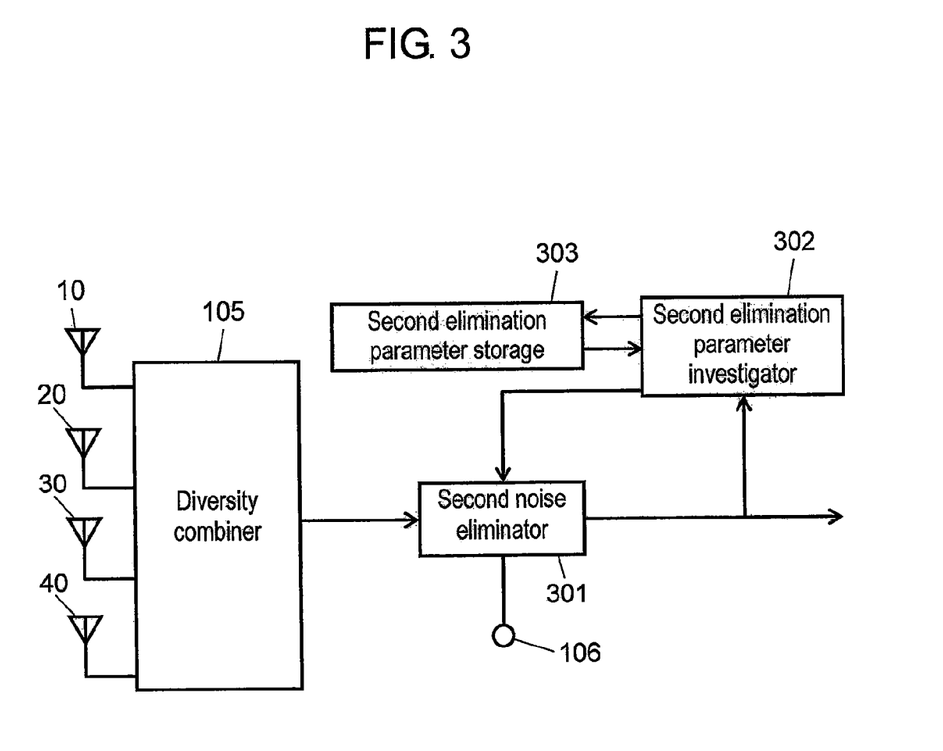
FIG. 3 is a schematic diagram showing a typical configuration of a demodulation device according to a second exemplary embodiment.

FIG. 3 shows a typical configuration of the demodulation device according to the second exemplary embodiment of this invention. In FIG. 3, all components other than second noise eliminator 301, second elimination parameter investigator 302 and second elimination parameter storage 303 are identical to those employed in FIG. 1, and their details will therefore be omitted.

Figure 4:
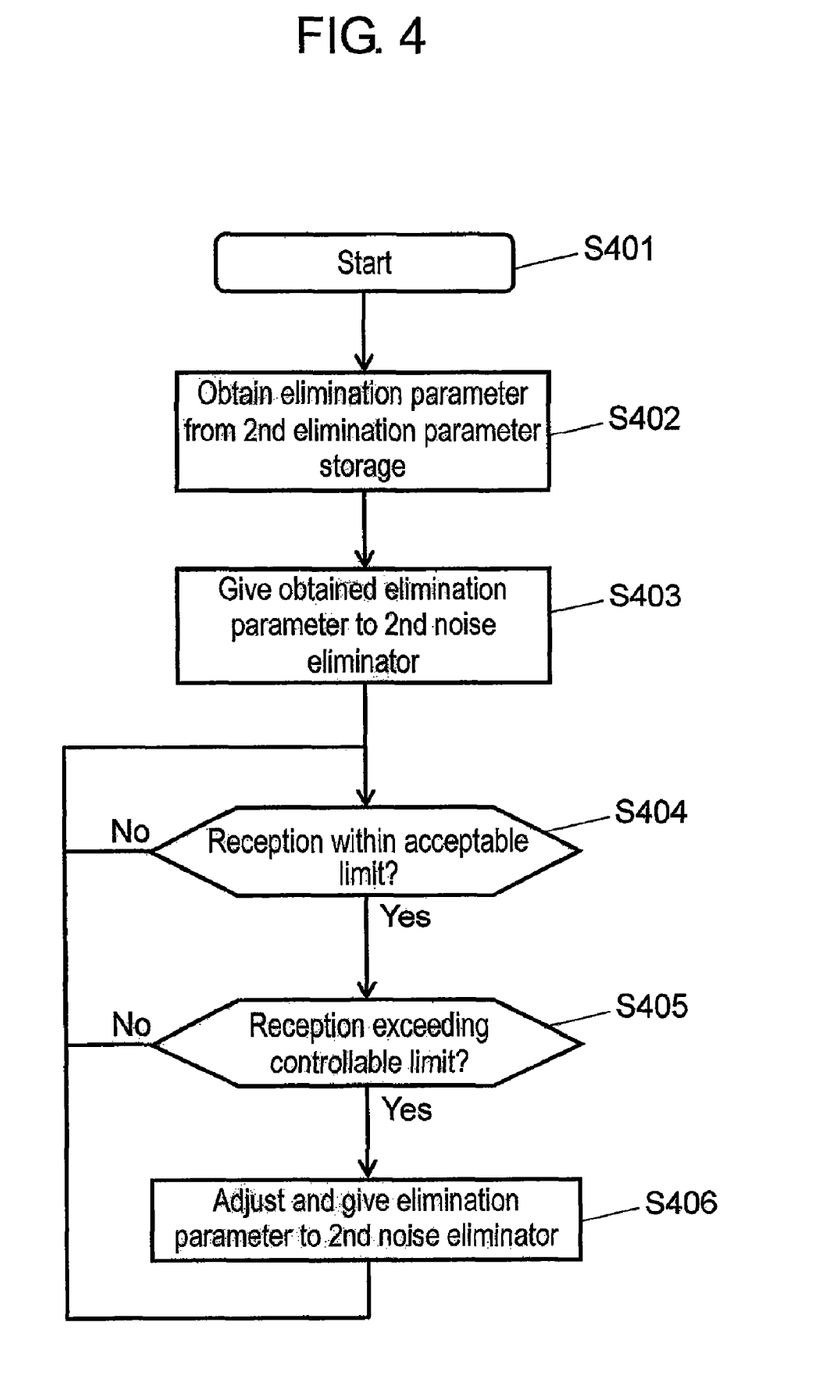
FIG. 4 is a flow chart of controlling an elimination parameter according to the second exemplary embodiment.

Second elimination parameter investigator 302 gives second elimination parameters to second noise eliminator 301. FIG. 4 is a flowchart showing an example of controlling the second elimination parameters.

In step S401 of FIG. 4, the demodulation device starts demodulating operation. In step S402, second elimination parameter investigator 302 obtains the second elimination parameters from second elimination parameter storage 303. The process then advances to step S403.

In step S403, second elimination parameter investigator 302 gives the obtained second elimination parameters to second noise eliminator 301, and the process advances to step S404.

In step 404, second elimination parameter investigator 302 checks a noise-eliminated signal output from second noise eliminator 301 to examine as to whether a condition of reception is acceptable. For example, second elimination parameter investigator 302 examines the condition of reception based on a carrier-to-noise ratio (C/N ratio), a bit error rate and the like of the digital signal, and checks if the condition is within a predetermined acceptable limit. The process advances to step S405 when the condition of reception is within the acceptable limit, or returns to the step S404 if the condition exceeds the acceptable limit.

In step S405, second elimination parameter investigator 302 checks the noise-eliminated signal output from second noise eliminator 301 to determine as to whether the condition of reception is ameliorable by adjusting the second elimination parameters. For instance, second elimination parameter investigator 302 examines the condition of reception based on information such as a synchronizing lock data of OFDM, a carrier-to-noise ratio (C/N ratio), a bit error rate and the like of the digital signal. The process then advances to step S406 when second elimination parameter investigator 302 determines that the condition is ameliorable by adjusting the second elimination parameters, or returns to the step S404 if the condition is determined as being not ameliorable.

In step S406, while adjusting the second elimination parameters given to second noise eliminator 301, second elimination parameter investigator 302 collects results by using the carrier-to-noise ratio (C/N ratio), the bit error rate and the like of the digital signal. Second elimination parameter investigator 302 then figures out corresponding values of the second elimination parameters that provide the optimum reception, and gives these values to second noise eliminator 301 while storing them in second elimination parameter storage 303. The process then returns to step S404. In order to figure out the optimum values of the second elimination parameters, for example, one method is to vary the phase adjusting factor θ in increments of one degree within a range of 170 and 190 degrees and the amplitude adjusting factor θ in increments of 0.1 within a multiplication range of 0.1 and 2.0, collect data of C-N ratios resulting from various combinations of the factors θ and G, and find out a combination that provide the best result.

In FIG. 3, second noise eliminator 301 performs the same function as the normal operation of first noise eliminator 108 described in the first exemplary embodiment, except that second noise eliminator 301 obtains the second elimination parameters from second elimination parameter investigator 302 rather than second elimination parameter storage 303.

As discussed above, the second exemplary embodiment can raise noise immunity of the demodulation device since it revises the second elimination parameters while monitoring the condition of reception, in addition to the advantage of achieving noise elimination within the single component irrespective of a number of the antennas.

Although the description provided above is an example of storing the revised elimination parameters, this is illustrative and not restrictive such that the revised parameters need not be stored.

The present invention has thus been described by means of the first and the second exemplary embodiments. As has been obvious from the described embodiments, the demodulation device of this invention has the noise eliminator perform the function of eliminating all noises in the plural branches of antennas collectively, and it can hence achieve elimination of the noises within the single component irrespective of any number of antennas.

In addition, the demodulation device of this invention is capable of eliminating the noises immediately after the power supply is turned on.

Furthermore, the demodulation device of this invention can revise the elimination parameters according to the condition of reception.

Moreover, the demodulation device of this invention can make use of the revised elimination parameters even after the power supply is turned off and on again since they store the revised elimination parameters.

INDUSTRIAL APPLICABILITY

The demodulation device of the present invention is advantageous for use as a demodulation device of any type for receiving and demodulating diversity radio waves.

REFERENCE MARKS IN THE DRAWINGS 10, 20, 30 and 40 Antenna
12, 22, 32 and 42 Frequency converter
14, 24, 34, 44 and 203 Automatic gain adjuster
16, 26, 36 and 46 Fourier transformer
19, 29, 39, 49 and 204 Phase/amplitude modifier
105 Diversity combiner
106 Noise collection probe
107 First elimination parameter storage
108 First noise eliminator
109 First elimination parameter investigator
110 Operation controller
201 Combiner
202 Frequency converter
205 Adder
301 Second noise eliminator
302 Second elimination parameter investigator
303 Second elimination parameter storage

The invention claimed is:

1. A demodulation device comprising:
a first elimination parameter storage for storing an elimination parameter defined as a first elimination parameter used for eliminating a noise for each of a plurality of antennas;
a noise collector for receiving the noise and outputting the received noise as a collected noise signal;
a diversity combiner for combining radio waves received from the plurality of antennas to obtain a combined signal, and outputting the combined signal along with a combining parameter, which represents a parameter related to the combining for each of the antennas; and
a first noise eliminator for reading the first elimination parameter from the first elimination parameter storage, receiving the combined signal, the combining parameter and the collected noise signal to execute elimination of the noise, and outputting a noise-eliminated signal.

2. The demodulation device of claim 1, wherein the first noise eliminator executes elimination of the noise by using the first elimination parameters for all of the antennas and the combining parameters for all of the antennas.

3. The demodulation device of claim 1, wherein the first elimination parameter storage stores the first elimination parameter determined in advance.

4. A demodulation device comprising:
an elimination parameter storage for storing an elimination parameter used for eliminating a noise for each of a plurality of antennas;
a noise collector for receiving the noise and outputting the received noise as a collected noise signal;
a diversity combiner for combining radio waves received from the plurality of antennas to obtain a combined signal, and outputting the combined signal along with a combining parameter, which represents a parameter related to the combining for each of the antennas;

an elimination parameter investigator for receiving the elimination parameter from the elimination parameter storage, obtaining a noise-eliminated signal, and outputting the elimination parameter; and a noise eliminator for receiving the combined signal, the elimination parameter, the combining parameter and the collected noise signal to execute elimination of the noise, and outputting the noise-eliminated signal.

5. The demodulation device of claim 4, wherein the noise eliminator executes elimination of the noise by using the elimination parameters for all of the antennas and the combining parameters for all of the antennas.

6. The demodulation device of claim 4, wherein the elimination parameter storage stores the elimination parameter determined in advance.

7. The demodulation device of claim 4, wherein the elimination parameter investigator monitors the noise-eliminated signal, and revises the elimination parameter indicating to the noise eliminator based on a condition of the reception.

8. The demodulation device of claim 7, wherein the elimination parameter investigator has the revised elimination parameter stored in the elimination parameter storage according as the elimination parameter investigator revises the elimination parameter indicating to the noise eliminator.

* * * * *